United States Patent
Bodin et al.

(10) Patent No.: US 7,822,702 B2
(45) Date of Patent: Oct. 26, 2010

(54) CREATING A SESSION LOG FOR STUDYING USABILITY OF COMPUTING DEVICES USED FOR SOCIAL NETWORKING BY FILTERING OBSERVATIONS BASED ON ROLES OF USABILITY EXPERTS

(75) Inventors: William K. Bodin, Austin, TX (US); Ann M. Maynard, Austin, TX (US); Derral C. Thorson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 668 days.

(21) Appl. No.: 11/769,365

(22) Filed: Jun. 27, 2007

(65) Prior Publication Data

US 2009/0006306 A1 Jan. 1, 2009

(51) Int. Cl.
*G06F 15/00* (2006.01)
(52) U.S. Cl. .................................. 706/62; 705/319
(58) Field of Classification Search .............. 706/45, 706/59, 62; 386/69; 702/120; 715/723; 705/319
See application file for complete search history.

(56) References Cited

U.S. PATENT DOCUMENTS

| 5,086,393 | A | 2/1992 | Kerr et al. | |
|---|---|---|---|---|
| 5,999,908 | A | 12/1999 | Abelow | |
| 6,741,967 | B1 | 5/2004 | Wu et al. | |
| 7,133,834 | B1 | 11/2006 | Abelow | |
| 2002/0012520 | A1* | 1/2002 | Nagasaka et al. | 386/46 |
| 2005/0254775 | A1* | 11/2005 | Hamilton et al. | 386/46 |
| 2006/0184980 | A1* | 8/2006 | Cole | 725/88 |
| 2006/0279628 | A1* | 12/2006 | Fleming | 348/143 |
| 2007/0106551 | A1* | 5/2007 | McGucken | 705/10 |
| 2009/0006108 | A1* | 1/2009 | Bodin et al. | 705/1 |
| 2009/0006306 | A1* | 1/2009 | Bodin et al. | 706/59 |
| 2009/0006966 | A1* | 1/2009 | Bodin et al. | 715/723 |

OTHER PUBLICATIONS

Spertus, Evaluating Similarity Measures: A Large Scale Study in the Orkut Social Network, 2005, ACM, PP1-7.*
Kushniruk et al., Conitive and usbaility engineering methods for the evaluation of clinical information systems, Sep. 2003, Elsevier Inc., pp. 62-73.*

(Continued)

*Primary Examiner*—David R Vincent
(74) *Attorney, Agent, or Firm*—H. Barrett Spraggins; Justin Dillon; Biggers & Ohanian, LLP (57) ABSTRACT

Methods, systems, and products are disclosed for creating a session log for studying usability of one or more computing devices used for social networking that include: receiving, by a usability engine from at least one usability expert, usability observations observed by the usability expert during a usability session for studying interaction support provided by one or more computing devices to a plurality of users interacting within a social network through the computing devices; recording, by the usability engine, the usability observations in a session log; detecting, by an event listener on at least one of the computing devices, an event generated by the computing device as a result of an interaction among the plurality of users within the social network; notifying, by the event listener, the usability engine of the event; and recording, by the usability engine, a description of the event in the session log.

15 Claims, 7 Drawing Sheets

OTHER PUBLICATIONS

Jokela, et al.; Methods for Quantitative Usability Requirements: A Case Study on the Development of the User Interface of a Mobile Phone; Oct. 2005; pp. 345-355; Springer-Verlag London Limited 2005.

Kangas, et al.; Applying User-Centered Design to Mobile Application Development; Communications of the ACM; Jul. 2005; pp. 55-59; vol. 48, No. 7; ACM.

Kjeldskov, et al.; Instant Data Analysis: Conducting Usability Evaluations in a Day; NordiCHI '04; Oct. 2004; pp. 344-351; ACM 1-58113-857-01/04/10; Tampere, Finland.

Rosenbaum, et al.; Usability in Practice: User Experience Lifecycle—Evolution and Revolution; CHI 2002; Apr. 2002; pp. 898-903; ACM 1-58113-454-1/02/0004; Minneapolis, Minnesota, USA.

* cited by examiner

CREATING A SESSION LOG FOR STUDYING USABILITY OF COMPUTING DEVICES USED FOR SOCIAL NETWORKING BY FILTERING OBSERVATIONS BASED ON ROLES OF USABILITY EXPERTS

BACKGROUND OF THE INVENTION

1. Field of the Invention

The field of the invention is data processing, or, more specifically, methods, systems, and products for creating a session log for studying usability of one or more computing devices used for social networking.

2. Description of Related Art

When computer architects design a computing device and its software, these architects often make a great effort to ensure that the device is convenient and easy to use from the perspective of a user. For example, the buttons on the device should be easily accessible when needed for device interaction, while not hindering the user's interaction with the device when the buttons are not in use. As a further example, the graphical user interface of a device should be logically arranged and configured from the user's perspective such that the user's interaction with the device is intuitive for the user.

To ensure that a computing device is convenient and easy to use from a user's perspective, computer architects typically perform usability studies on the interaction of a user with the computing device. Usability refers to a full range of aspects that impact a user's success and satisfaction when interacting with the device. Usability encompass issues such as, for example, a user's understanding of how to operate the device's interface, the ease with which a user is able to physically manipulate the device and its controls, a user's emotions while interacting with the device, the correspondence between the user's desired output from the device and the output actually produced by the device, and so on. In studying a device's usability, high usability is generally regarded as a desirable feature of the device.

Usability studies have traditionally been conducted by having a usability expert observe a user interacting with a computing device and record the expert's observations in a log. The drawback to this traditional approach to studying usability is that the information recorded in the log is limited to the observations capable of being observed by a usability expert. As devices have become smaller and more complex, the ability of a usability expert to observe important aspects affecting the user's interaction with a computing device is greatly diminished. In particular, some aspects of the user's interaction may not be observable at all. As such, readers will appreciate that room for improvement exists in the area of studying the usability of a computing device.

SUMMARY OF THE INVENTION

Methods, systems, and products are disclosed for creating a session log for studying usability of one or more computing devices used for social networking that include: receiving, by a usability engine from at least one usability expert, usability observations observed by the usability expert during a usability session for studying interaction support provided by one or more computing devices to a plurality of users interacting within a social network through the computing devices; recording, by the usability engine, the usability observations in a session log; detecting, by an event listener on at least one of the computing devices, an event generated by the computing device as a result of an interaction among the plurality of users within the social network; notifying, by the event listener, the usability engine of the event; and recording, by the usability engine, a description of the event in the session log.

The foregoing and other features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
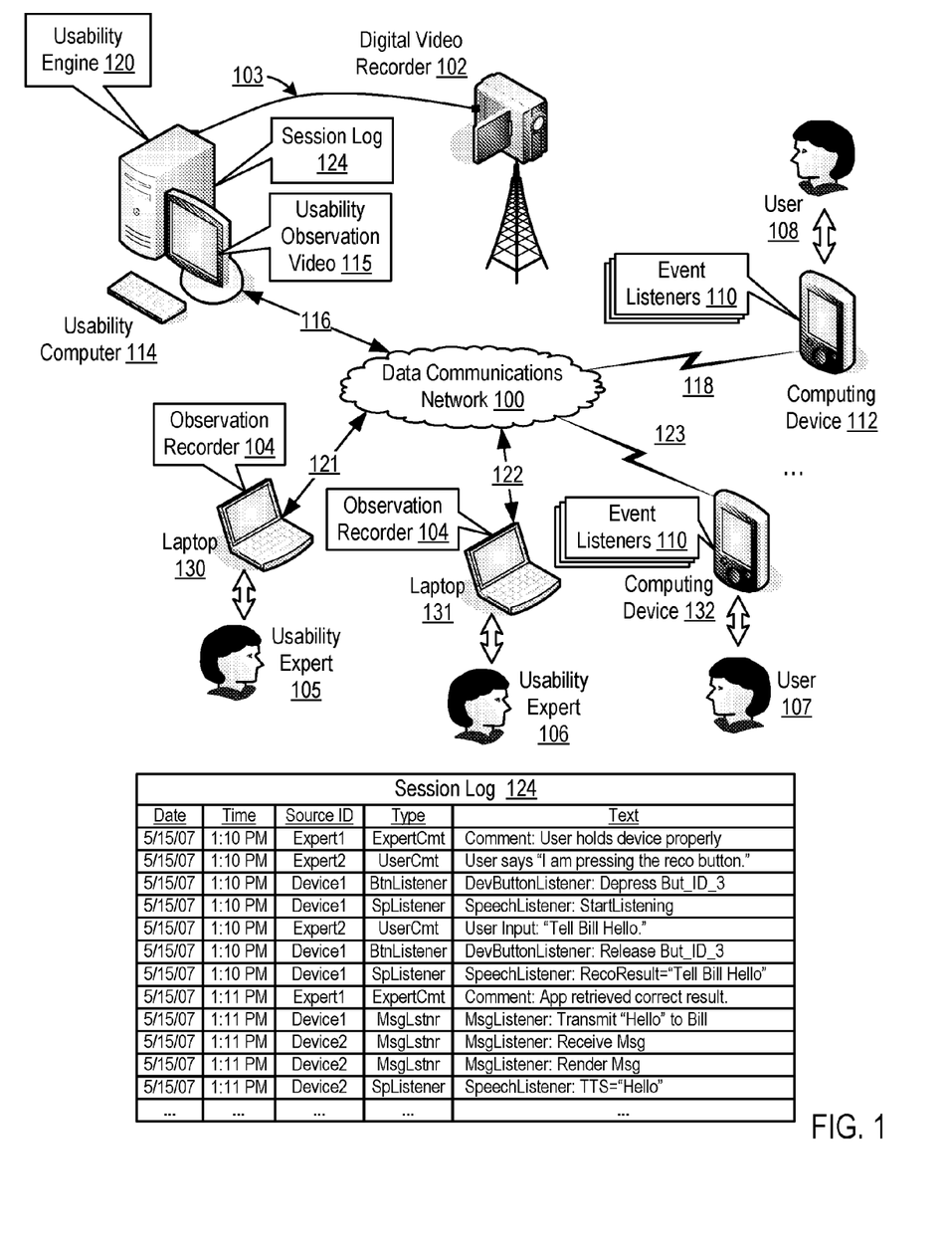
FIG. 1 sets forth a network diagram of a system for creating a session log for studying usability of one or more computing devices used for social networking according to embodiments of the present invention.

Exemplary methods, systems, and products for creating a session log for studying usability of one or more computing devices used for social networking in accordance with the present invention are described with reference to the accompanying drawings, beginning with FIG. 1. FIG. 1 sets forth a network diagram of a system for creating a session log (124) for studying usability of one or more computing devices (112, 132) used for social networking according to embodiments of the present invention. The exemplary system of FIG. 1 operates generally for creating a session log (124) for studying usability of one or more computing devices (112, 132) used for social networking according to embodiments of the present invention as follows: A usability engine (120) receives, from at least one usability expert (105, 106), usability observations observed by the usability expert (105, 106) during a usability session for studying interaction support provided by one or more computing devices (112, 132) to a plurality of users (107, 108) interacting within a social network through the computing devices (112, 132). The usability engine (120) records the usability observations in a session log (124). An event listener (110) on at least one of the computing devices (112, 132) detects an event generated by the computing device (112, 132) as a result of an interaction among the plurality of users (107, 108) within the social network. The event listener (110) notifies the usability engine (120) of the event. The usability engine (120) then records a description of the event in the session log (124).

A social network is a network of users having a particular type of relationship among one another. For example, a social network may be composed of all the people within a particular family because each member of the family has a familial relationship with other family members. As a further example, a social network may be composed of all the people within a particular company because each member of the company has a working relationship with other company members. A still further example, a social network may be composed of a group of people having the same interests such as, for example, sports, hobbies, or games.

In the example of FIG. 1, user (107) and user (108) belong to the same social network and interact within that social network through the computing devices (112, 132). The computing device (112) is connected to data communications network (100) through wireless connection (118), and the computing device (132) is connected to data communications network (100) through wireless connection (123). In the exemplary system of FIG. 1, readers will note that the computing devices (112, 132) is implemented as a personal digital assistant ('PDA'). Readers will note, however, that such an implementation is for example only and not for limitation. In fact, the computing device (112, 132) may be implemented as any general-purpose or special-purpose computing device as will occur to those of skill in the art. Examples of computing devices may include desktop computers, laptop computers, cell phones, gaming consoles, PDAs, personal video recorders, and any other computing device as will occur to those of skill in the art.

In the example of FIG. 1, each computing device (112, 132) is being studied for usability by a plurality of usability experts (105, 106). Each usability expert (105, 106) is a person who specializes in the study of how people interact with and use computing devices. Each usability expert may possess general knowledge regarding the field of usability or may specialize in certain aspects of usability. For example, a usability expert may specialize as a cognitive psychologist, user interface specialist, an application expert, a language specialist, and so on. In the example of FIG. 1, the usability experts (105, 106) observe usability observations during a usability session for studying interaction support provided by the computing devices (112, 132) to the users (107, 108) interacting within a social network through the computing devices (112, 132). The devices (112, 132) support interaction among the users (107, 108) by providing an interface through which the users (107, 108) may communicate among one another. Studying such interaction support provided by the devices (112, 132) may include, for example, studying how a user feels the device aided or inhibited communication, studying how the user utilized the device to effect the communication, studying the ease at which the user is able to communicate within the social network using the device, and so on.

In the example of FIG. 1, each usability expert (105, 106) may observe the user (108) interacting with the computing device (112) from a usability observation video (115) provided by the usability engine (120). The usability engine (120) captures the usability observation video (115) using a digital video recorder (102). The digital video recorder (102) of FIG. 1 is a portable electronic device for capturing video images and audio and recording video images and audio onto a storage medium. The storage medium may include, for example, flash memory, video tape, or any other storage medium as will occur to those of skill in the art. The digital video recorder (102) typically transmits and stores the usability observation video (115) using an encoder/decoder ('codec') such as, for example, Cinepak, Motion JPEG, MPEG, and so on. In the example of FIG. 1, the digital video recorder (102) transmits the usability observation video (115) for storage on the usability computer (114) through the data communications cable (103). The data communications cable (103) may be implemented as a Universal Serial Bus cable, Serial Digital Interface cable, FireWire cable, High-Definition Multimedia Interface Cable, or any other data communications cable as will occur to those of skill in the art.

In the example of FIG. 1, the usability observation video (115) recorded by the digital video recorder (102) is a digital video. A digital video is a collection of digital frames typically used to create the illusion of a moving picture. Each frame of digital video includes image data for rendering one still image and metadata associated with the image data. The metadata of each frame may include synchronization data for synchronizing the frame with an audio stream, configurational data for devices displaying the frame, closed captioning data, and so on. Each frame is typically displayed by a display device that flashes each frame on a display screen for a brief period of time, typically ¹⁄₂₄th, ¹⁄₂₅th or ¹⁄₃₀th of a second, and then immediately replaces the frame displayed on the display screen with the next frame of the digital video. As a person views the display screen, persistence of vision in the human eye blends the displayed frames together to produce the illusion of a moving image.

In the exemplary system of FIG. 1, each usability expert (105, 106) views the usability observation video (115) using a laptop (130, 131). The usability expert (105) views the video (115) on the display screen of laptop (130) connected to the network (100) through a wireline connection (121). The usability expert (106) views the video (115) on the display screen of laptop (131) connected to the network (100) through a wireline connection (122). Each laptop (130, 131) of FIG. 1 may receive and display the usability observation video (115) from the usability engine (120) using a media player such as, for example, the Windows Media Player, QuickTime, RealPlayer, Winamp, and so on.

Each laptop (130, 131) in the exemplary system of FIG. 1 has installed upon it an observation recorder (104). The observation recorder (104) of FIG. 1 is a software component that supports creating a session log for studying usability of one or more computing devices used for social networking according to embodiments of the present invention. The observation recorder (104) of FIG. 1 supports creating a session log for studying usability of one or more computing devices used for social networking according to embodiments of the present invention by accepting as input observation data from the usability experts (105, 106) and providing the observation data to a usability engine (120) for storage in the session log (124) on the usability computer (114). Using the observation recorder (104), each 1usability expert (105, 106) of FIG. 1 records usability observations in a session log (124) that the usability expert observed during a usability session for studying interaction support provided by the computing devices (112, 132) to the users (107, 108) interacting within a social network through the computing devices (112, 132). A usability session is a period of time dedicated by a user to interact with a particular computing device being studied for usability.

In the example of FIG. 1, the observation recorder (104) may provide the observation data to a usability engine (120) using data communications architectures such as, for example, web services, CORBA, Java™ Remote Method Invocation API, and so on. 'CORBA' refers to the Common Object Request Broker Architecture, a computer industry specifications for interoperable enterprise applications produced by the Object Management Group ('OMG'). CORBA is a standard for remote procedure invocation first published by the OMG in 1991. CORBA can be considered a kind of object-oriented way of making remote procedure calls, although CORBA supports features that do not exist in conventional RPC. CORBA uses a declarative language, the Interface Definition Language ("IDL"), to describe an object's interface. Interface descriptions in IDL are compiled to generate 'stubs' for the client side and 'skeletons' on the server side. Using this generated code, remote method invocations effected in object-oriented programming languages, such as C++ or Java, look like invocations of local member methods in local objects.

The Java™ Remote Method Invocation API is a Java application programming interface for performing remote procedural calls published by Sun Microsystems™. The Java™ RMI API is an object-oriented way of making remote procedure calls between Java objects existing in separate Java™ Virtual Machines that typically run on separate computers. The Java™ RMI API uses a remote procedure object interface to describe remote objects that reside on the server. Remote procedure object interfaces are published in an RMI registry where Java clients can obtain a reference to the remote interface of a remote Java object. Using compiled 'stubs' for the client side and 'skeletons' on the server side to provide the network connection operations, the Java™ RMI allows a Java client to access a remote Java object just like any other local Java object.

In the exemplary system of FIG. 1, the computing device (112) has installed upon it several event listeners (110). An event listener is a software component that detects the occurrence of an event that was generated as a result of user interaction with the device (112). The event listeners (110) of FIG. 1 may be able to detect the occurrence of events such as, for example, when a user depresses or releases a button on the device (112), when the user selects components on the device's graphical user interface, when software on the device processes a user's request or provides the user with output, and so on. An event listener may be implemented as interrupt handler, instrumentation code having instrumentation hooks embedded in other software components, a subroutine called by another software module, or any other implementation as will occur to those of skill in the art. In the example of FIG. 1, each event listener (110) operates for creating a session log for studying usability of one or more computing devices used for social networking according to embodiments of the present invention. Each event listener (110) of FIG. 1 operates for creating a session log for studying usability of one or more computing devices used for social networking according to embodiments of the present invention by detecting an event generated by the computing device as a result of an interaction among the users (107, 108) within the social network and notifying the usability engine (120) of the event. In the example of FIG. 1, each event listener (110) may notify the usability engine (120) of the event using data communications architectures such as, for example, web services, CORBA, Java™ Remote Method Invocation API, and so on.

As mentioned above, the exemplary system of FIG. 1 also includes a usability computer (114) connected to the data communications network (100) through wireline connection (116). The usability computer (114) of FIG. 1 has installed upon it a usability engine (120). The usability engine (120) is a software component that receives event notifications from one or more event listeners (110) and that administers the session log (124) and the usability observation video (115). The usability engine (120) of FIG. 1 includes computer program instructions configured for creating a session log for studying usability of one or more computing devices used for social networking according embodiments of the present invention. The usability engine (120) of FIG. 1 operates generally for creating a session log for studying usability of one or more computing devices used for social networking according embodiments of the present invention by: The usability engine (120) receives, from at least one usability expert (105, 106), usability observations observed by the usability expert (105, 106) during a usability session for studying interaction support provided by the computing devices (112, 132) to the users (107, 108) interacting within a social network through the computing devices (112, 132); recording the usability observations in a session log (124); and recording a description of the event detected by the event listener (110) in the session log (124).

The session log (124) of FIG. 1 is a data structure that stores information provided by a usability expert that describes an interaction of a user with a computing device during a usability session and information provided by one or more event listeners that is generate as a result of the user interaction with the device. A session log may be implemented as a table of a database, text file, or any other implementation as will occur to those of skill in the art. In the example of FIG. 1, the session log (124) is implemented as a table. Each record of the table represents observation data provided by the usability expert (106) or an event detected by one of the event listeners (110) on the computing device (112). Each record includes a 'Date' field that indicates the date on which the information in record was generated. Each record includes a 'Time' field that indicates the time at which the information in the record was generated. Each record includes a 'Source ID' field that specifies the source of the information stored in the record. For example, a value of 'Expert1' for the 'Source ID' field specifies that the information is a usability observation entered by a usability expert identified as 'Expert1.' A value of 'Device1' for the 'Source ID' field specifies that the information is an event description detected by an event listener on a device identified as 'Device1.' Each record also includes a 'Type' field that specifies which event listener generated the event description when the record contains an event description. For example, a value of 'BtnListener' for the 'Type' field indicates that the record represents an event detected by an event listeners identified as 'BtnListener.' When the record contains a usability observation provided by a usability expert, the 'Type' field specifies the type of observation made by the expert. For example, a value of 'ExpertCmt' for the 'Type' field indicates that the record represents a comment authored by the usability expert. A value of 'UserCmt' for the 'Type' field indicates that the record represents a comment authored by the user (108) and recorded by the usability expert. Each record also includes a 'Text' field that provides details of the usability observation recorded by the usability expert (105, 106, 107) or the event description provided by an event listener (110).

As mentioned above, the usability experts (105, 106) of FIG. 1 may specialize in certain aspects of usability when studying the interaction support provided by the computing devices (112, 132). For example, one usability expert may specialize as a cognitive psychologist, another as a user interface specialist, another as an application expert, still another as a language specialist, and so on. Because each usability expert (105, 106) may have a particular role in studying the interaction support provided by the computing devices (112, 132), the usability engine (120) of FIG. 1 may also operate for creating a session log for studying usability of one or more computing devices used for social networking according to embodiments of the present invention by filtering the usability observations in dependence upon the particular role of each usability expert (105, 106) or weighting the usability observations in dependence upon the particular role of each usability expert (105, 106).

In the exemplary system of FIG. 1, some usability experts (105, 106) may find event descriptions useful in aiding the expert's ability to assess the usability of the device (112, 132). The usability engine (120) of FIG. 1 therefore may also operate for creating a session log for studying usability of one or more computing devices used for social networking according to embodiments of the present invention by providing, to each of the usability experts (105, 106), the description of the event. Because each usability expert (105, 106) have a particular role in studying the usability of the device (112, 132), the usability engine (120) may provide event descriptions to the usability experts (105, 106) by filtering the description of the event to be provided to each usability expert (105, 106) in dependence upon the particular role of each usability expert (105, 106). In other embodiments, the usability engine (120) may provide event descriptions to the usability experts (105, 106) by embedding the description of the event in the usability observation video (115) and displaying the usability observation video to the usability expert for observing usability observations, including displaying the description of the event.

The arrangement of servers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example Transmission Control Protocol ('TCP'), Internet Protocol ('IP'), HyperText Transfer Protocol ('HTTP'), Wireless Access Protocol ('WAP'), Handheld Device Transport Protocol ('HDTP'), and others as will occur to those of skill in the art. Various embodiments of the present invention may be implemented on a variety of hardware platforms in addition to those illustrated in FIG. 1.

Creating a session log for studying usability of one or more computing devices used for social networking in accordance with the present invention may be implemented with one or more computing devices, that is automated computing machinery. For further explanation, therefore, FIG. 2 sets forth a block diagram of automated computing machinery comprising an exemplary computing device (112) useful in creating a session log for studying usability of one or more computing devices used for social networking according to embodiments of the present invention. The computing device (112) of FIG. 2 includes at least one computer processor (156) or 'CPU' as well as random access memory (168) ('RAM') which is connected through a high speed memory bus (166) and bus adapter (158) to processor (156) and to other components of the computing device.

Figure 2:
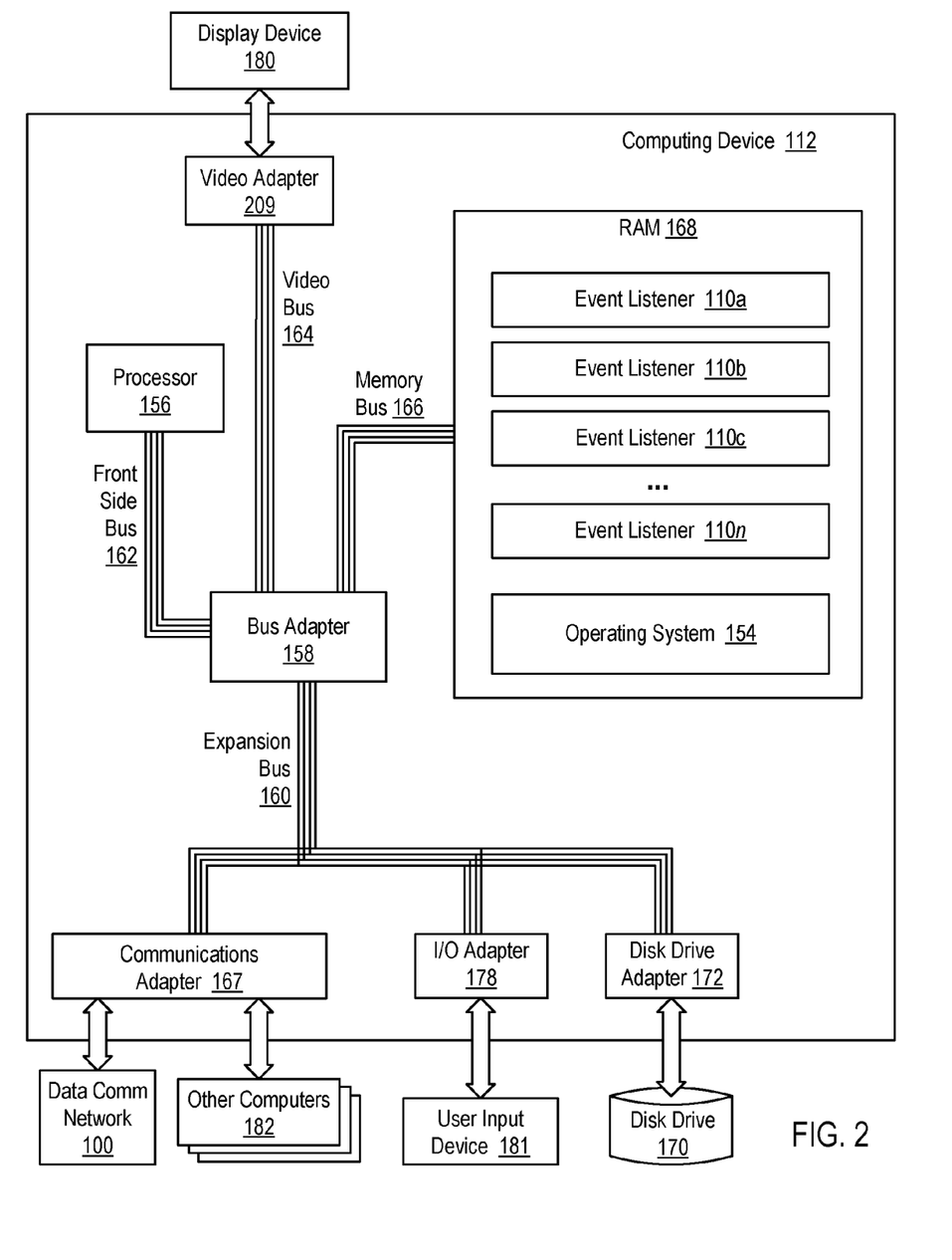
FIG. 2 sets forth a block diagram of automated computing machinery comprising an exemplary computing device useful in creating a session log for studying usability of one or more computing devices used for social networking according to embodiments of the present invention.

Stored in RAM (168) are several event listeners (110). An event listener is a software component that detects the occurrence of an event that was generated as a result of user interaction with the device (112). The event listeners (110) of FIG. 2 may be able to detect the occurrence of events such as, for example, when a user depresses or releases a button on the device (112), when the user selects components on the device's graphical user interface, when software on the device processes a user's request or provides the user with output, and so on. An event listener may be implemented as interrupt handler, instrumentation code having instrumentation hooks embedded in other software components, a subroutine called by another software module, or any other implementation as will occur to those of skill in the art. In the example of FIG. 2, each event listener (110) operates for creating a session log for studying usability of one or more computing devices used for social networking according to embodiments of the present invention. Each event listener (110) of FIG. 2 operates for creating a session log for studying usability of one or more computing devices used for social networking according to embodiments of the present invention by detecting an event generated by the computing device as a result of an interaction among the plurality of users within the social network and notifying a usability engine on a usability computer of the event.

Also stored in RAM (168) is an operating system (154). Operating systems useful in computing devices according to embodiments of the present invention include UNIX™, Linux™, Microsoft NT™, IBM's AIX™, IBM's i5/OS™, and others as will occur to those of skill in the art. The operating system (154) and the event listeners (110) in the example of FIG. 2 are shown in RAM (168), but many components of such software typically are stored in non-volatile memory also, for example, on a disk drive (170).

The exemplary computing device (112) of FIG. 2 includes bus adapter (158), a computer hardware component that contains drive electronics for high speed buses, the front side bus (162), the video bus (164), and the memory bus (166), as well as drive electronics for the slower expansion bus (160). Examples of bus adapters useful in computing devices useful according to embodiments of the present invention include the Intel Northbridge, the Intel Memory Controller Hub, the Intel Southbridge, and the Intel I/O Controller Hub. Examples of expansion buses useful in computing devices useful according to embodiments of the present invention may include Peripheral Component Interconnect ('PCI') buses and PCI Express ('PCIe') buses.

The exemplary computing device (112) of FIG. 2 also includes disk drive adapter (172) coupled through expansion bus (160) and bus adapter (158) to processor (156) and other components of the exemplary computing device (112). Disk drive adapter (172) connects non-volatile data storage to the exemplary computing device (112) in the form of disk drive (170). Disk drive adapters useful in computing devices include Integrated Drive Electronics ('IDE') adapters, Small Computer System Interface ('SCSI') adapters, and others as will occur to those of skill in the art. In addition, non-volatile computer memory may be implemented for a computing device as an optical disk drive, electrically erasable programmable read-only memory (so-called 'EEPROM' or 'Flash' memory), RAM drives, and so on, as will occur to those of skill in the art.

The exemplary computing device (112) of FIG. 2 includes one or more input/output ('I/O') adapters (178). I/O adapters in computing devices implement user-oriented input/output through, for example, software drivers and computer hardware for controlling output to display devices such as computer display screens, as well as user input from user input devices (181) such as keyboards and mice. The exemplary computing device (112) of FIG. 2 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computing device (112) of FIG. 2 includes a communications adapter (167) for data communications with other computers (182) and for data communications with a high speed, low latency data communications network (100). Such data communications may be carried out through Ethernet™ connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for creating a session log for studying usability of one or more computing devices used for social networking according to embodiments of the present invention include modems for wired dial-up communications, IEEE 802.3 Ethernet adapters for wired data communications network communications, and IEEE 802.11b adapters for wireless data communications network communications.

Although FIG. 2 is discussed with reference to exemplary computing devices having installed upon them event listeners, readers will note that automated computing machinery used to implement exemplary usability computers having installed upon them usability engines useful in creating a usability observation video for a computing device being studied for usability according to embodiments of the present invention are similar to the exemplary computing device (112) of FIG. 2. That is, such exemplary usability computers having installed upon them usability engines include one or more processors, bus adapters, buses, RAM, video adapters, communications adapters, I/O adapters, disk drive adapters, and other components similar to the exemplary computing device (112) of FIG. 2 as will occur to those of skill in the art.

Figure 3:
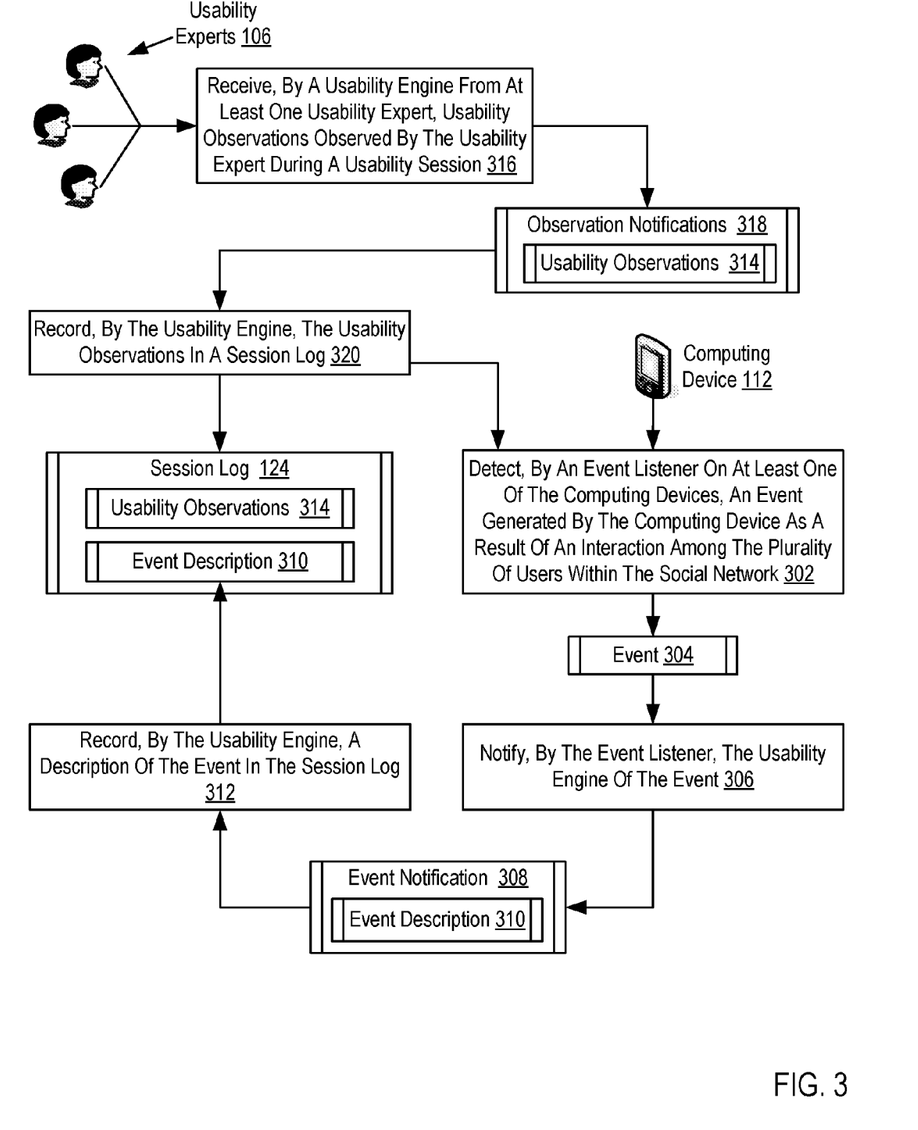
FIG. 3 sets forth a flow chart illustrating an exemplary method of creating a session log for studying usability of one or more computing devices used for social networking according to embodiments of the present invention.

For further explanation, FIG. 3 sets forth a flow chart illustrating an exemplary method of creating a session log for studying usability of one or more computing devices used for social networking according to embodiments of the present invention. The method of FIG. 3 includes receiving (316), by a usability engine from at least one usability expert (106), usability observations (318) observed by the usability expert (106) during a usability session for studying interaction support provided by one or more computing devices (112) to a plurality of users interacting within a social network through the computing devices (112). A usability observation is a description of any aspect of the user's interaction with the device that a usability expert (106) deems relevant to the usability study. For example, usability observations may describe the user's emotional state as the user operates the device (112), the speech spoken by the user to the device (112), the synthesized speech provided by the device (112) to the user, a description of how well the user appears to be operating the device, and any other aspect of the user's interaction that the usability expert (106) deems relevant to the usability study.

Receiving (316), by a usability engine from at least one usability expert (106), usability observations (314) observed by the usability expert (106) according to the method of FIG. 1 may be carried out by receiving a observation notification message (318) from observation recorder software installed on the usability expert's computer. The usability expert (106) providing the usability observations (314) may enter the observations (314) into observation recorder software installed on the usability expert's computer as the usability expert views the usability observation video (115). As the observation recorder software receives usability observations (314) from a usability expert (106), the observation recorder software may timestamp the usability observations (314), encapsulate the usability observations in the observation notification message (318), and transmit the observation notification message (318) to the usability engine through a data communications connection. The data communications connection may be implemented using web service, a CORBA framework, Java RMI, or any other implementation as will occur to those of skill in the art.

The method of FIG. 3 includes recording (320), by the usability engine, the usability observations (314) in a session log (124). The usability engine may record (320) the usability observations (314) in the session log (124) according to the method of FIG. 3 by unencapsulating the usability observations (314) from the observation notification message (318) and storing the usability observations (314) in the session log (124). The usability engine may store the usability observations (314) in the session log (124) as the usability observations (314) are received from the observation recorder software used by the usability experts (106) to enter the observation (314). The session log (124) of FIG. 3 represents a data structure that stores information provided by a usability expert that describes an interaction of a user with a computing device during a usability session and information provided by one or more event listeners that is generated as a result of the user interaction with the device. A session log may be implemented as a table of a database, text file, or any other implementation as will occur to those of skill in the art.

The method of FIG. 3 also includes detecting (302), by an event listener on at least one of the computing devices (112), an event (304) generated by the computing device (112) as a result of an interaction among the plurality of users within the social network. An event (304) of FIG. 3 represents any event generated by the computing device (112) as a result of an interaction among the plurality of users within the social network. Examples of events may include when a user depresses or releases a button on the device (112), when the user selects components on the device's graphical user interface, when software on the device processes a user's request or provides the user with output, when the device provides voice services to the user, and any other event as will occur those of skill in the art. An event listener is a software component that detects the occurrence of an event that was generated as a result of user interaction with the device (112). An event listener may be implemented as interrupt handler, instrumentation code having instrumentation hooks embedded in other software components, a subroutine called by another software module, or any other implementation as will occur to those of skill in the art.

Because some event listeners may only be concerned with a single event and are only executed when the event occurs, such an event listener may detect (302) an event (304) according to the method of FIG. 3 by receiving processing control of the computing device's processor upon the occurrence of the event. Processing control may be transferred to an event listener using an interrupt or through a function call directed by another software module. In other embodiments, an event listener may detect (302) an event (304) according to the method of FIG. 3 by polling hardware registers or software variables to identify whether a particular event has occurred.

The method of FIG. 3 includes notifying (306), by the event listener, the usability engine of the event (304). A usability engine is a software component that receives event notifications from one or more event listeners and that administers the session log (124) and the usability observation video (115). The event listener may notify (306) a usability engine of the event (304) according to the method of FIG. 3 by encapsulating a description (310) of the event in an event notification message (308) and transmitting the event notification message (308) to the usability engine. The event listener may transmit the event notification message (308) to the usability engine using any message passing mechanism as will occur to those of skill in the art, including web services, a CORBA framework, and Java RMI. The event notification message (308) of FIG. 3 represents a data structure for providing a usability engine with information regarding an event that occurred on the computing device (112) in response to a users interacting within a social network through the computing device (112). The description (310) of the event in an event notification message (308) may include the following exemplary information:

- Date, which specifies the date on which the event was detected;
- Time, which specifies the time at which the event was detected;
- Priority, which specifies the level of importance of the event;
- Listener Identifier, which specifies the particular listener on the computing device that detected the event; and
- Event Description, which provides event specific details concerning the event.

The method of FIG. 3 includes recording (312), by the usability engine, a description (310) of the event (304) in the session log (124). The usability engine may record (312) a description (310) of the event (304) in the session log (124) according to the method of FIG. 3 by receiving the event notification message (308) provided by the event listener, extracting the description (310) of the event (304) from the event notification message (308), and storing the event description (310) in the session log (124).

As mentioned above, usability experts may specialize in certain aspects of usability when studying the interaction support provided by one or more computing devices. For example, one usability expert may specialize as a cognitive psychologist, another as a user interface specialist, another as an application expert, still another as a language specialist, network traffic engineer, and so on. Because each usability expert may have a particular role in studying the interaction support provided by the computing devices, the usability engine may filter the usability observations provided by the experts in dependence upon the particular role of each usability expert during the usability session. For further explanation, FIG. 4 sets forth a flow chart illustrating a further exemplary method of creating a session log for studying usability of one or more computing devices used for social networking according to embodiments of the present invention in which each usability expert (106) has a particular role in studying the interaction support provided by the computing devices (112).

Figure 4:
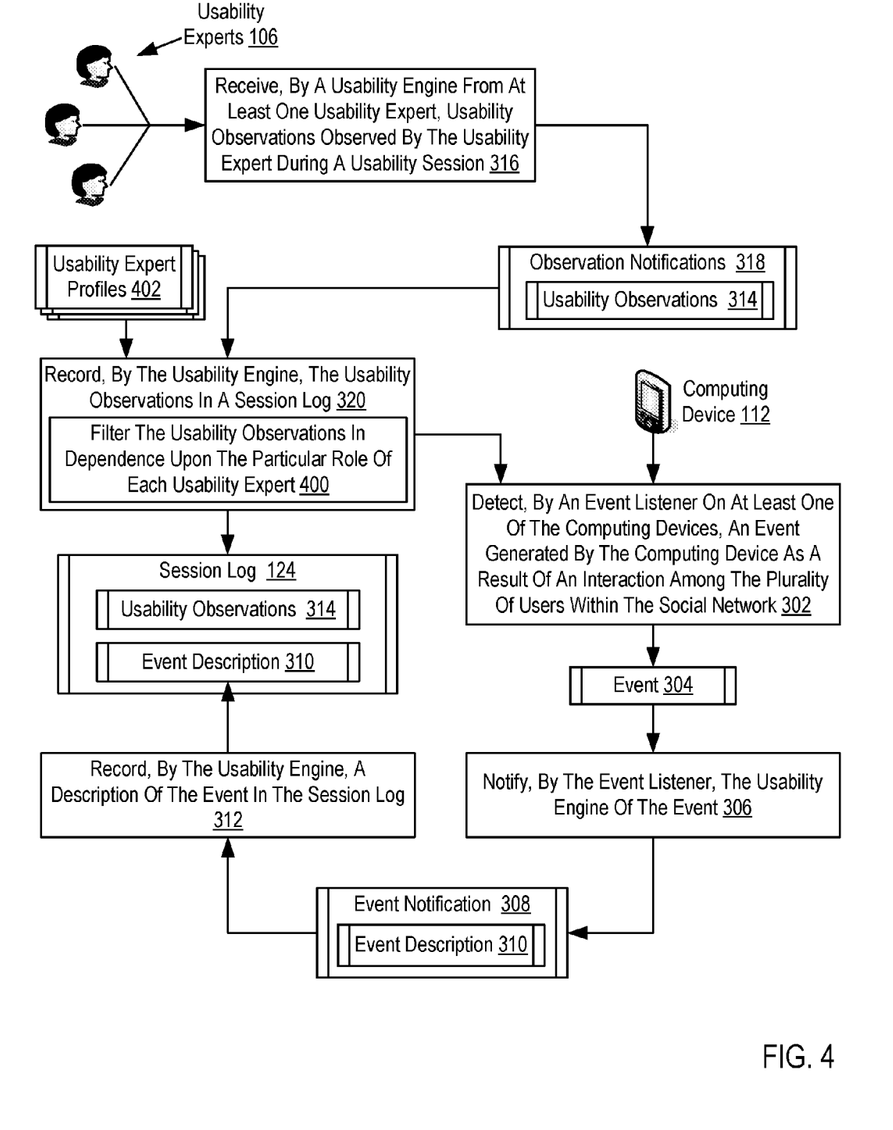
FIG. 4 sets forth a flow chart illustrating a further exemplary method of creating a session log for studying usability of one or more computing devices used for social networking according to embodiments of the present invention.

The method of FIG. 4 is similar to the method of FIG. 3. That is, the method of FIG. 4 includes: receiving (316), by a usability engine from at least one usability expert (106), usability observations (314) observed by the usability expert (106) during a usability session for studying interaction support provided by one or more computing devices (112) to a plurality of users interacting within a social network through the computing devices (112); recording (320), by the usability engine, the usability observations (314) in a session log (124); detecting (302), by an event listener on at least one of the computing devices (112), an event (304) generated by the computing device (112) as a result of an interaction among the plurality of users within the social network; notifying (306), by the event listener, the usability engine of the event (304); and recording (312), by the usability engine, a description (310) of the event (304) in the session log (124).

In the method of FIG. 4, recording (320), by the usability engine, the usability observations (314) in a session log (124) includes filtering (400) the usability observations (314) in dependence upon the particular role of each usability expert (106). The usability engine may filter (400) the usability observations (314) in dependence upon the particular role of each usability expert (106) according to the method of FIG. 4 by determining whether the observation type of the usability observations (314) provided by the usability expert (106) is authorized for storage in the session log (124) in dependence upon usability expert profiles (402). If the observation type of the usability observations (314) provided by the usability expert (106) is authorized for storage in the session log (124) in dependence upon usability expert profiles (402), then the usability engine records the usability observation (314) in the session log (124). If the observation type of the usability observations (314) provided by the usability expert (106) is not authorized for storage in the session log (124) in dependence upon usability expert profiles (402), then the usability engine does not record the usability observation (314) in the session log (124).

The usability expert profiles (402) of FIG. 4 represent data structures that associate observation types of usability observations with particular usability experts. Associating an observation type with a particular usability expert in the usability expert profile (402) indicates that the particular usability expert is authorized to provide usability observations of that observation type for storage in the session log (124). For further explanation, consider the following exemplary usability expert profile:

```
<Usability_Expert_Profile>
    <Expert ID = "Expert1">
        <Type ID = "Cognitive">
        <Type ID = "Language">
    </Expert>
    <Expert ID = "Expert2">
        <Type ID = "User Interface">
        <Type ID = "Language">
    </Expert>
    <Expert ID = "Expert3">
        <Type ID = "Application">
    </Expert>
</Usability_Expert_Profile>
```

The exemplary usability expert profile above associates observation types with three usability experts identified as 'Expert1,' 'Expert2,' and 'Expert3.' The exemplary usability expert profile above associates the observation types 'Cognitive' and 'Language' with usability expert 'Expert1,' which indicates that usability expert 'Expert1' is authorized to provide usability observations having a 'Cognitive' or 'Language' observation type for storage in the session log (124). The exemplary usability expert profile above associates the observation types 'User Interface' and 'Language' with usability expert 'Expert2,' which indicates that usability expert 'Expert2' is authorized to provide usability observations having a 'User Interface' or 'Language' observation type for storage in the session log (124). The exemplary usability expert profile above associates the observation types 'Application' with usability expert 'Expert3,' which indicates that usability expert 'Expert3' is authorized to provide usability observations having an 'Application' observation type for storage in the session log (124). Readers will note that the exemplary usability expert profile above is for explanation and not for limitation.

Filtering usability observations in dependence upon the particular role of each usability expert as described above may be used to ensure that only usability observations provided by experts with relevant expertise regarding the particular type of observation are recorded in a session log. In other embodiments, however, it may be useful to record all the usability observations regardless of the expert that provided the observation. For further explanation, therefore, FIG. 5 sets forth a flow chart illustrating a further exemplary method of creating a session log for studying usability of one or more computing devices used for social networking according to embodiments of the present invention in which each usability expert (106) has a particular role in studying the interaction support provided by the computing devices (112).

Figure 5:
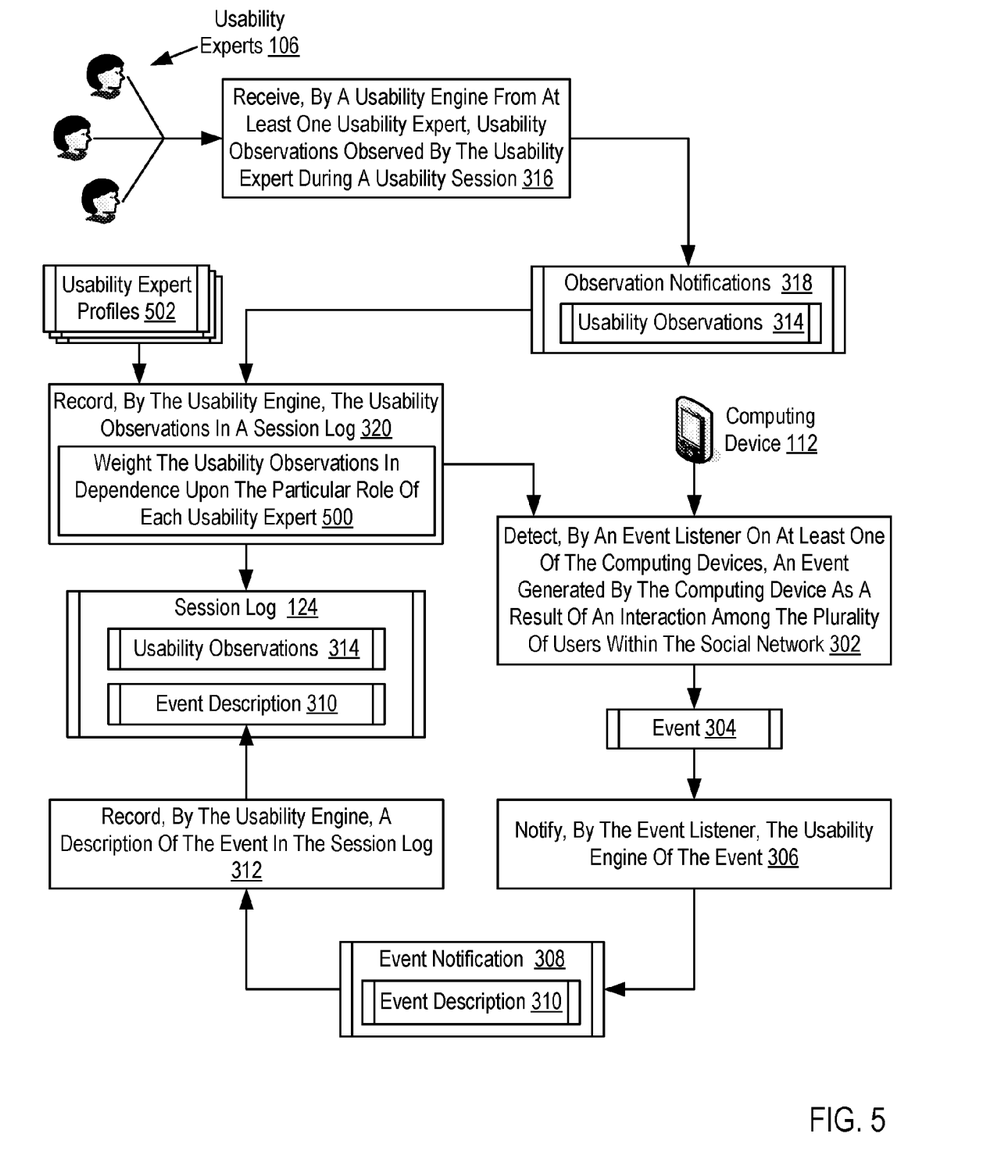
FIG. 5 sets forth a flow chart illustrating a further exemplary method of creating a session log for studying usability of one or more computing devices used for social networking according to embodiments of the present invention.

The method of FIG. 5 is similar to the method of FIG. 3. That is, the method of FIG. 5 includes: receiving (316), by a usability engine from at least one usability expert (106), usability observations (314) observed by the usability expert (106) during a usability session for studying interaction support provided by one or more computing devices (112) to a plurality of users interacting within a social network through the computing devices (112); recording (320), by the usability engine, the usability observations (314) in a session log (124); detecting (302), by an event listener on at least one of the computing devices (112), an event (304) generated by the computing device (112) as a result of an interaction among the plurality of users within the social network; notifying (306), by the event listener, the usability engine of the event (304); and recording (312), by the usability engine, a description (310) of the event (304) in the session log (124).

In the method of FIG. 5, recording (320), by the usability engine, the usability observations (314) in a session log (124) includes weighting (500) the usability observations (314) in dependence upon the particular role of each usability expert (106). The usability engine may weight (500) the usability observations (314) in dependence upon the particular role of each usability expert (106) according to the method of FIG. 5 by identifying a weight assigned to the type of the usability observations (314) provided by the usability expert (106) in dependence upon usability expert profiles (502), and recording the assigned weight in the session log along with the usability observation (314).

The usability expert profiles (502) of FIG. 5 represent data structures that associate weights for particular observation types with particular usability experts. For further explanation, consider the following exemplary usability expert profile:

```
<Usability_Expert_Profile>
    <Expert ID = "Expert1">
        <Type ID = "Cognitive"> weight = 1.0 </Type>
        <Type ID = "Language"> weight = 0.7 </Type>
    </Expert>
    <Expert ID = "Expert2">
        <Type ID = "User Interface"> weight = 1.0 </Type>
        <Type ID = "Language"> weight = 0.4 </Type>
    </Expert>
    <Expert ID = "Expert3">
        <Type ID = "Application"> weight = 1.0 </Type>
    </Expert>
</Usability_Expert_Profile>
```

The exemplary usability expert profile above associates weights with observation types for three usability experts identified as 'Expert1,' 'Expert2,' and 'Expert3.' The exemplary usability expert profile above associates a weight of '1.0' with the observation type 'Cognitive' and associates a weight of '0.7' with the observation type 'Language' for usability expert 'Expert1.' Such weighting may indicate that the expert's cognitive observations are more highly regarded than the expert's language observations. The exemplary usability expert profile above associates a weight of '1.0' with the observation type 'User Interface' and associates a weight of '0.4' with the observation type 'Language' for usability expert 'Expert2.' Such weighting may indicate that the expert's user interface observations are more highly regarded than the expert's language observations. The exemplary usability expert profile above associates a weight of '1.0' with the observation type 'Application' for usability expert 'Expert3.' Readers will note that the exemplary usability expert profile above is for explanation and not for limitation.

As usability experts study the usability of a computing device, some of the usability experts may find event descriptions of events detected on the computing device useful in assessing the device's overall usability. A usability engine may therefore provide the usability experts with the descriptions of the events detected by event listeners on the device. For further explanation, consider FIG. 6 that sets forth a flow chart illustrating a further exemplary method of creating a session log for studying usability of one or more computing devices used for social networking according to embodiments of the present invention.

Figure 6:
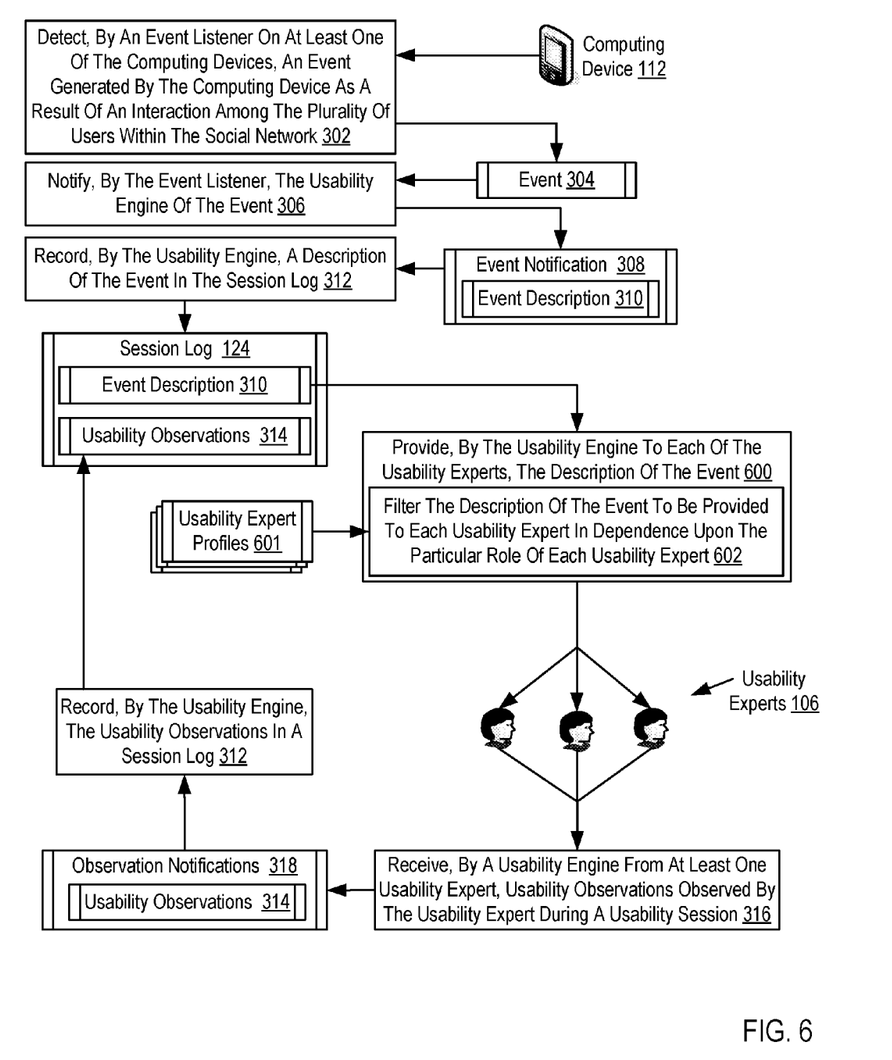
FIG. 6 sets forth a flow chart illustrating a further exemplary method of creating a session log for studying usability of one or more computing devices used for social networking according to embodiments of the present invention.

The method of FIG. 6 is similar to the method of FIG. 3. That is, the method of FIG. 6 includes: receiving (316), by a usability engine from at least one usability expert (106), usability observations (314) observed by the usability expert (106) during a usability session for studying interaction support provided by one or more computing devices (112) to a plurality of users interacting within a social network through the computing devices (112); recording (320), by the usability engine, the usability observations (314) in a session log (124); detecting (302), by an event listener on at least one of the computing devices (112), an event (304) generated by the computing device (112) as a result of an interaction among the plurality of users within the social network; notifying (306), by the event listener, the usability engine of the event (304); and recording (312), by the usability engine, a description (310) of the event (304) in the session log (124).

The method of FIG. 6 also includes providing (600), by the usability engine to each of the usability experts (106), the description (310) of the event (304). The usability engine may provide (600) the description (310) of the event (304) to the usability experts (106) according to the method of FIG. 6 by transmitting the event description (310) to the usability experts (106) using instant messaging. The instant messaging of the description (310) may be implemented according to any number of instant messaging protocols such as, for example, the Internet Relay Chat ('IRC') protocol, the Microsoft Notification protocol, the Extensible Messaging and Presence protocol, or any other instant messaging protocol as will occur to those of skill in the art.

In the example of FIG. 6, each usability expert (106) has a particular role in studying the interaction support provided by the computing devices (112). For example, one usability expert may specialize as a cognitive psychologist, another as a user interface specialist, another as an application expert, still another as a language specialist, and so on. Because each usability expert (106) has a particular role in studying the interaction support provided by the computing devices (112), not all of the event descriptions detected on the device (112) may be relevant to all of the usability experts (106). In the method of FIG. 6, therefore, providing (600), by the usability engine to each of the usability experts (106), the description (310) of the event (304) is carried out by filtering (602) the description (310) of the event to be provided to each usability expert (106) in dependence upon the particular role of each usability expert (106). The usability engine may filter (602) the description (310) of the event (304) to be provided to each usability expert (106) according to the method of FIG. 6 by determining whether a particular usability expert (106) is authorized for receive particular types of event descriptions in dependence upon usability expert profiles (601). If a particular usability expert (106) is authorized for receive particular types of event descriptions in dependence upon usability expert profiles (601), then the usability engine provides the particular usability expert (106) with the description (310) of the event (304). If a particular usability expert (106) is not authorized for receive particular types of event descriptions in dependence upon usability expert profiles (601), then the usability engine does not provide the particular usability expert (106) with the description (310) of the event (304).

The usability expert profiles (601) of FIG. 6 represent data structures that associate types of event descriptions with particular usability experts. Associating a particular type of event description with particular usability experts in a usability expert profile (601) indicates that the particular usability expert is authorized to receive event descriptions of that type. For further explanation, consider the following exemplary usability expert profile:

```
<Usability_Expert_Profile>
    <Expert ID = "Expert1">
        <EventDescType ID = "SpeechListener">
    </Expert>
    <Expert ID = "Expert2">
        <EventDescType ID = "DevButtonListener">
    </Expert>
    <Expert ID = "Expert3">
        <EventDescType ID = "GUIListener">
    </Expert>
</Usability_Expert_Profile>
```

The exemplary usability expert profile above associates types of event descriptions with three usability experts identified as 'Expert1,' 'Expert2,' and 'Expert3.' The exemplary usability expert profile above associates the 'SpeechListener' event description type with usability expert 'Expert1,' which indicates that usability expert 'Expert1' is authorized to receive event descriptions of events generated by the event listener identified as 'SpeechListener.' The exemplary usability expert profile above associates the 'DevButtonListener' event description type with usability expert 'Expert2,' which indicates that usability expert 'Expert2' is authorized to receive event descriptions of events generated by the event listener identified as 'DevButtonListener.' The exemplary usability expert profile above associates the 'GUIListener' event description type with usability expert 'Expert3,' which indicates that usability expert 'Expert3' is authorized to receive event descriptions of events generated by the event listener identified as 'GUIListener.' Readers will note that the exemplary usability expert profile above is for explanation and not for limitation.

As mentioned above, a usability engine may provide a usability observation video to usability experts allowing them to view the interaction between a user and the computing device being studied for usability. When a usability engine provides a usability observation video to the usability experts, the usability engine may provide event descriptions to each of the experts by embedding the description of the event in the usability observation video being displayed to the experts. For further explanation, consider FIG. 7 that sets forth a flow chart illustrating a further exemplary method of creating a session log for studying usability of one or more computing devices used for social networking according to embodiments of the present invention.

Figure 7:
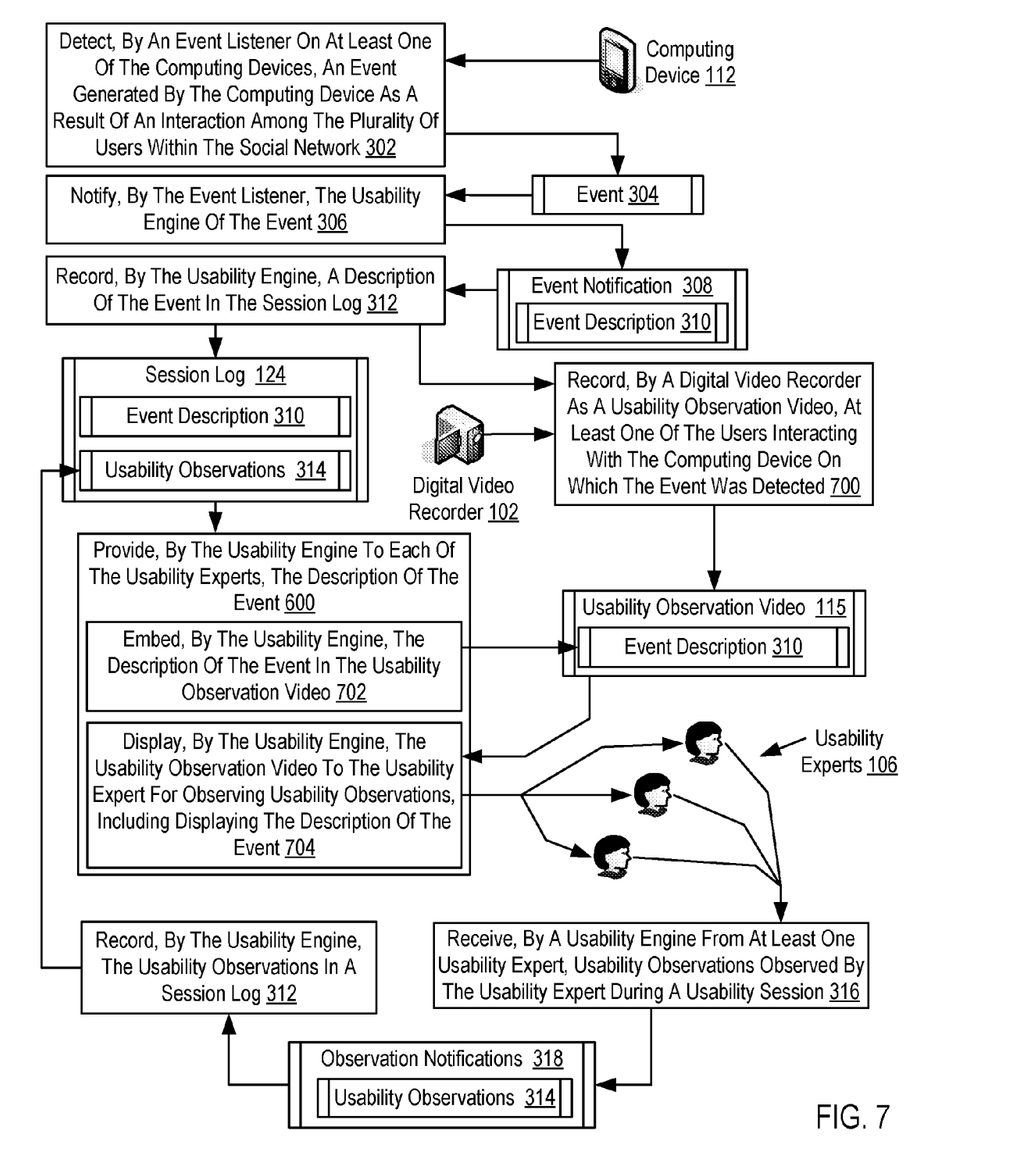
FIG. 7 sets forth a flow chart illustrating a further exemplary method of creating a session log for studying usability of one or more computing devices used for social networking according to embodiments of the present invention.

The method of FIG. 7 is similar to the method of FIG. 3. That is, the method of FIG. 7 includes: receiving (316), by a usability engine from at least one usability expert (106), usability observations (314) observed by the usability expert (106) during a usability session for studying interaction support provided by one or more computing devices (112) to a plurality of users interacting within a social network through the computing devices (112); recording (320), by the usability engine, the usability observations (314) in a session log (124); detecting (302), by an event listener on at least one of the computing devices (112), an event (304) generated by the computing device (112) as a result of an interaction among the plurality of users within the social network; notifying (306), by the event listener, the usability engine of the event (304); and recording (312), by the usability engine, a description (310) of the event (304) in the session log (124).

The method of FIG. 7 includes recording (700), by a digital video recorder (102) as a usability observation video (115), at least one of the users interacting with the computing device (112) on which the event (304) was detected. The digital video recorder (102) may record (700), as a usability observation video (115), a user interacting with the computing device (112) according to the method of FIG. 7 by converting analogue audio and video signals received from the recorder's audio/visual input components into digital audio and video signals and storing the digital audio and video signals as frames using one or more codecs as will occur to those of skill in the art. The digital video recorder (102) may then transmit the usability observation video (115) to a usability computer having installed upon it the usability engine through a data communications connection.

In the method of FIG. 7, providing (600), by the usability engine to each of the usability experts (106), the description (310) of the event (304) includes embedding (702), by the usability engine, the description (310) of the event (304) in the usability observation video (115). The usability engine may embed (702) the description (310) of the event (304) in the usability observation video (115) according to the method of FIG. 7 by identifying the frames that make up the portion of the video (115) recorded when the event listener detected the event (304) described by the event description (310) and storing the event description (310) as metadata in the frames that make up the identified portion of the video (115). The usability engine may store the event description (310) as metadata using, for example, closed captioning channels such as Line 21 in the vertical blanking interval or those described in the Electronic Industries Alliance ('EIA')-708 specification, or some other metadata structures for the video as will occur to those of skill in the art.

In the example of FIG. 7, the event description (124) for the event (304) specifies the time at which the event listener on the computing device (112) detected the event (304). Furthermore, the usability observation video (115) of FIG. 7 includes embedded timecodes. The timecodes embedded in the usability observation video (115) are signals typically encoded in each frame of the usability observation video (115) to identify each frame and to provide the frame's relative location in the video timeline. The timecodes embedded in the usability observation video (115) may be implemented as Society of Motion Picture and Television Engineers ('SMPTE') timecodes, MIDI timecodes, Rewriteable Consumer timecodes, and any other timecodes as will occur to those of skill in the art.

The usability engine may identify the portion of the usability observation video (115) recorded when the event (304) was detected by scanning the frames of the usability observation video (115) to determine which frames have timecodes that match the time specified in the event description (310). The usability engine may identify the frames that have timecodes matching the time specified in the event description (310) as the portion of the usability observation video (115) recorded when the event (304) was detected. When matching the timecodes of the frames to the time specified in the event description (310), the usability engine may take into account any timing skews that result from two different clocks being used to embed the timecodes into the frames and the embed the time in the event description (310). To correct any such timing skews, the usability engine may calculate the skew between the clock used to embed the timecodes into the frames and the clock used to embed the time in the event description (310) and factor in the calculated timing skew when matching the timecodes of the frames to the time specified in the event description (310).

The method of FIG. 7 also includes displaying (704), by the usability engine, the usability observation video (115) to the usability expert (106) for observing usability observations (314), including displaying the description (310) of the event (304). The usability engine may display (704) the usability observation video (115) to the usability expert (106) according to the method of FIG. 7 by receiving an indication to transmit the video (115) from each of the usability experts (106) and streaming the usability observation video (115) to media players operated by the experts (106). The usability engine may display (704) the usability observation video (115) to the usability expert (106) according to the method of FIG. 7 in real-time during the usability session or after the usability session has completed.

Exemplary embodiments of the present invention are described largely in the context of a fully functional computer system for creating a session log for studying usability of one or more computing devices used for social networking. Readers of skill in the art will recognize, however, that the present invention also may be embodied in a computer program product disposed on computer readable media for use with any suitable data processing system. Such computer readable media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of creating a session log for studying usability of one or more computing devices used for social networking, the method comprising:
receiving, by a usability engine from at least one usability expert, usability observations observed by the usability expert during a usability session for studying interaction support provided by one or more computing devices to a plurality of users interacting within a social network through the computing devices;
recording, by the usability engine, the usability observations in a session log;
detecting, by an event listener on at least one of the computing devices, an event generated by the computing device as a result of an interaction among the plurality of users within the social network;
notifying, by the event listener, the usability engine of the event; and
recording, by the usability engine, a description of the event in the session log, wherein each usability expert has a particular role in studying the interaction support provided by the computing devices and recording the usability observations in a session log further comprises filtering the usability observations in dependence upon the particular role of each usability expert, including determining whether an observation type of each of the usability observations is authorized for storage in the session log in dependence upon usability expert profiles.

2. The method of claim 1 wherein:
recording, by the usability engine, the usability observations in a session log further comprises weighting the usability observations in dependence upon the particular role of each usability expert.

3. The method of claim 1 further comprising providing, by the usability engine to each of the usability experts, the description of the event.

4. The method of claim 3 wherein:
each usability expert has a particular role in studying the interaction support provided by the computing devices; and
providing, by the usability engine to each of the usability experts, the description of the event further comprises filtering the description of the event to be provided to each usability expert in dependence upon the particular role of each usability expert.

5. The method of claim 3 wherein:
the method further comprises recording, by a digital video recorder as a usability observation video, at least one of the users interacting with the computing device on which the event was detected; and
providing, by the usability engine to each of the usability experts, the description of the event further comprises:
embedding, by the usability engine, the description of the event in the usability observation video, and
displaying, by the usability engine, the usability observation video to the usability expert for observing usability observations, including displaying the description of the event.

6. A system for creating a session log for studying usability of one or more computing devices used for social networking, the system comprising:
means for receiving, from at least one usability expert, usability observations observed by the usability expert during a usability session for studying interaction support provided by one or more computing devices to a plurality of users interacting within a social network through the computing devices;

means for recording the usability observations in a session log;

means for detecting, on at least one of the computing devices, an event generated by the computing device as a result of an interaction among the plurality of users within the social network:

means for notifying a usability engine of the event; and means for recording, by the usability engine, a description of the event in the session log, wherein each usability expert has a particular role in studying the interaction support provided by the computing devices and recording the usability observations in a session log further comprises filtering the usability observations in dependence upon the particular role of each usability expert, including determining whether an observation type of each of the usability observations is authorized for storage in the session log in dependence upon usability expert profiles.

7. The system of claim 6 wherein:

the means for recording the usability observations in a session log further comprises means for weighting the usability observations in dependence upon the particular role of each usability expert.

8. The system of claim 6 further comprising means for providing, to each of the usability experts, the description of the event.

9. The system of claim 8 wherein:

each usability expert has a particular role in studying the interaction support provided by the computing devices; and the means for providing, by the usability engine to each of the usability experts, the description of the event further comprises means for filtering the description of the event to be provided to each usability expert in dependence upon the particular role of each usability expert.

10. The system of claim 8 wherein:

the system further comprises means for recording, as a usability observation video, at least one of the users interacting with the computing device on which the event was detected; and the means for providing, to each of the usability experts, the description of the event further comprises:

means for embedding the description of the event in the usability observation video, and means for displaying the usability observation video to the usability expert for observing usability observations, including means for displaying the description of the event.

11. A computer program product for creating a session log for studying usability of one or more computing devices used for social networking, the computer program product disposed upon a computer readable recordable medium, the computer program product comprising computer program instructions capable of:

receiving, by a usability engine from at least one usability expert, usability observations observed by the usability expert during a usability session for studying interaction support provided by one or more computing devices to a plurality of users interacting within a social network through the computing devices:

recording, by the usability engine, the usability observations in a session log;

detecting, by an event listener on at least one of the computing devices, an event generated by the computing device as a result of an interaction among the plurality of users within the social network;

notifying, by the event listener, the usability engine of the event; and recording, by the usability engine, a description of the event in the session log, wherein each usability expert has a particular role in studying the interaction support provided by the computing devices and recording the usability, observations in a session log further comprises filtering the usability observations in dependence upon the particular role of each usability expert, including determining whether an observation type of each of the usability observations is authorized for storage in the session log in dependence upon usability expert profiles.

12. The computer program product of claim 11 wherein:

recording, by the usability engine, the usability observations in a session log further comprises weighting the usability observations in dependence upon the particular role of each usability expert.

13. The computer program product of claim 11 further comprising computer program instructions capable of providing, by the usability engine to each of the usability experts, the description of the event.

14. The computer program product of claim 13 wherein:

each usability expert has a particular role in studying the interaction support provided by the computing devices; and providing, by the usability engine to each of the usability experts, the description of the event further comprises filtering the description of the event to be provided to each usability expert in dependence upon the particular role of each usability expert.

15. The computer program product of claim 13 wherein:

the computer program product further comprises computer program instructions capable of recording, by a digital video recorder as a usability observation video, at least one of the users interacting with the computing device on which the event was detected; and providing, by the usability engine to each of the usability experts, the description of the event further comprises:

embedding, by the usability engine, the description of the event in the usability observation video, and displaying, by the usability engine, the usability observation video to the usability expert for observing usability observations, including displaying the description of the event.

* * * * *